United States Patent
Komatsu et al.

[11] Patent Number: 6,014,370
[45] Date of Patent: Jan. 11, 2000

[54] APPARATUS FOR BRIDGING BETWEEN FIBRE CHANNEL NETWORKS AND ATM NETWORK

[75] Inventors: Shigehisa Komatsu; Kazuhiro Sato; Yuuichi Naruse, all of Tokyo, Japan

[73] Assignee: Nippon Telegraph & Telephone Corporation, Japan

[21] Appl. No.: 09/252,033

[22] Filed: Feb. 18, 1999

[30] Foreign Application Priority Data

Feb. 20, 1998 [JP] Japan .................................. 10-038916

[51] Int. Cl.[7] .................................................. H04L 12/26
[52] U.S. Cl. .......................... 370/248; 370/395; 370/466
[58] Field of Search .................................... 370/244, 242, 370/243, 250, 248, 345, 401, 403, 404, 465, 466, 395, 503

[56] References Cited

U.S. PATENT DOCUMENTS

| | | | |
|---|---|---|---|
| 5,079,764 | 1/1992 | Orita et al. ........................... | 370/85.13 |
| 5,291,491 | 3/1994 | Hutchison et al. .................... | 370/85.5 |
| 5,463,625 | 10/1995 | Yasrebi ................................. | 370/85.13 |
| 5,475,696 | 12/1995 | Taniguchi ............................. | 371/42 |
| 5,553,057 | 9/1996 | Nakayama ............................ | 370/13 |

*Primary Examiner*—Chau Nguyen
*Assistant Examiner*—Forood Boortalary
*Attorney, Agent, or Firm*—Burns, Doane, Swecker & Mathis LLP

[57] ABSTRACT

A bridging apparatus is provided to connect Fibre Channel networks to an ATM network. The apparatus includes a Fibre Channel-link monitoring section for monitoring and detecting an abnormal event in the Channel Fibre networks; an ATM network monitoring section for monitoring and detecting an abnormal event in the ATM network; and a control section for sending, when necessary, an abnormal notification cell to said ATM network upon an abnormal event in either the Fibre Channel networks or the ATM network; starting an initialization protocol of the Fibre Channel links, upon detecting the abnormal event or receiving an abnormal notification cell from the ATM network; stopping initializing protocol of the Fibre Channel links until an initialization-complete cell is received from the ATM network during execution of the initialization protocol of the Fibre Channel links, sending an initialization-start cell to the ATM network; and, sending an initialization-complete cell to the ATM network, when an initialization-start cell is received from the ATM network after sending an initialization-start cells.

12 Claims, 5 Drawing Sheets

APPARATUS FOR BRIDGING BETWEEN FIBRE CHANNEL NETWORKS AND ATM NETWORK

BACKGROUND OF THE INVENTION

1. Field of the Invention

The present invention relates to an apparatus for bridging an Asynchronous Transfer Mode (ATM) network with Fibre Channel networks to construct an FC/ATM composite network, and a method for detecting abnormalities in the inter-network bridging apparatus and controlling the process of initialization of Fibre Channel networks during the recovery stage.

This application is based on a patent application No. Hei 10-38916 filed in Japan, the content of which is incorporated herein by reference.

2. Description of the Related Art

Asynchronous Transfer Mode (ATM) is becoming the standard choice for a data transfer interface in high-speed broadband networks. Recently, an operating standard for an ATM-LAN network, produced by applying ATM to local area network (LAN), is being developed by an industrial group called the ATM-forum, and in the meantime, for American National Standards Institute (ANSI), operation of a high-speed interface called Fibre Channel, for serial transfer speeds in excess of 1 [Gbps], has been standardized.

Fibre Channel interface will be explained with reference to a protocol stack shown in FIG. 4. Fibre Channel (shortened to FC hereinbelow) refers to a protocol group, which comprises by a physical layer (FC-0), an encoding and decoding layer (FC-1), a frame generation and control layer (FC-2), a common service control layer (FC-3) for such tasks as multiple addressing, a matching layer (FC-4) for interfacing with existing protocols such as small computer system interface (SCSI) or internet protocol (IP). A network based on such protocol groups is the Fibre Channel network referred to FC network. Bridging between the apparatuses based on FC protocol at the level of physical layer and encoding/decoding layer is referred to an FC link. A Fibre Channel network is comprised by a plurality of such FC links.

Data sent from a upper layer protocol such as SCSI and IP to an FC protocol groups are mapped onto variable-length frames. Frame transfer is controlled according to a unit called a sequence which includes more than one frame. If an abnormal event occurs during a frame transfer process, the terminal that detects the abnormal event starts a command sequence in order to abort the offending sequence containing the abnormal frame. Those devices for terminating FC protocols, such as input/output terminals and FC switches, discard all the frames, contained in the offending sequence having the abnormal frame, that may remain in such areas as data transfer buffer.

Next, abnormal detection and notification in FC networks and initialization process for FC links will be explained with reference to FIG. 5, which shows an initialization protocol using ordered sets of codes for FC devices 501, 501' provided with FC protocol for terminating an FC link 502.

FC device 501 in the FC network, detecting a normality recovery in the FC link 502, performs initialization of FC link 502. Initialization process and abnormal detection/notification in the FC network are carried out by the receive/send actions of the ordered sets of codes generated in the encoding/decoding layer in the FC link. In more detail, the FC device 501 sends an special code OLS to the FC device 501' to indicate that it is in an "offline" state ready to carry out the initialization process. Upon receiving OLS code, FC device 501' sends a link reset code LR to FC device 501 to indicate that initialization is being performed. Upon receiving a link reset code LR, FC device 501 sends a link reset response code LRR to the FC device 501', as the response code to link reset code LR. When the link reset response code LRR is received at the FC device 501', the FC device 501' start sending a code Idle, indicating that it is now in a state to enable to transfer data. Upon receiving the code Idle, the FC device 501 similarly becomes ready to transfer data, and start sending a code Idle. Initialization of the FC link 502 is thus completed.

Protocols for Fibre Channels are detailed in "ANSI X3.230-1994, Fibre Channel Physical and Signal Interface (FC PH)" and "Fibre Channel Switch Fabric (FC-SW)".

Next, a conventional FC/ATM composite network, being proposed on a trial basis, comprised by FC networks and an ATM network connected through an inter-network bridging apparatus will be explained with reference to FIG. 6. FIG. 6 shows the configuration of the FC/ATM composite network comprised by terminals 601, 601'; FC switches 602, 602'; inter-network bridging apparatuses 603, 603'; FC links 604a, 604b, 604a', 604b'; FC networks 605, 605'; and an ATM network 606.

If an abnormal event occurs in ATM network 606 during terminals 601 and 601' are in communication, inter-network bridging apparatus 603 detecting the abnormal event generates a signal to indicate that abnormality has been detected in ATM network 606 and, if the ATM network 606 supports an alarm indication function, the ATM network 606 generates the alarm signal to inter-network bridging apparatus 603'. Inter-network bridging apparatus 603', receiving the alarm signal, stops data transfer to ATM network 606. However, in this case, the inter-network bridging apparatus 603' does not notify to the FC switch 602' which is connected through an FC link 604b', because this is a trial network and does not include a response protocol to abnormality.

In the meanwhile, terminal 601 detects a network abnormal event due to the fact that a response frame (ACK) to the dispatched frame does not arrive before timer expiration. Upon detecting the abnormality, terminal 601 starts a command sequence to abort the sequence that includes the frame which has not been acknowledged. In this abort sequence, the terminal 601 sends an abort notification frame to FC switch 602. Upon receiving abort sequence frame, the FC switch 602 discards the data remaining in the data transfer buffer having the sequence that includes the response frame (ACK), and a sequence abort command frame is sent to inter-network bridging apparatus 603. Upon receiving the sequence abort command frame, inter-network bridging apparatus 603 discards the data remaining in the data transfer buffer, similar to the case of the FC switch 602, and sends the sequence abort command frame, through the ATM network 606, to the inter-network bridging apparatus 603'. However, so long as the abnormality is not corrected in the ATM network, the sequence abort command frame cannot reach the inter-network bridging apparatus 603', and therefore, the response frame (ACK) in response to the abort command frame does not arrive at the terminal 601. At this point, terminal 601, the FC switch 602 and the inter-network bridging apparatus 603 start execution of the initialization process of FC network 605, beginning with initialization of FC links 604a, 604b. This action is also taken inside the FC network 605'.

Initialization processes in the FC networks 605 and 605' are undertaken at different times because the timer expiration occurs at different times in the terminals 601 and 601'.

Next, initialization protocol (shortened to init-protocol) in the FC networks 605, 605' will be explained with reference to the flowchart shown in FIG. 7. First, the FC network 605 is initialized by initializing FC link 604a, 604b bridging the devices comprising the FC network 605 (S701). After completing initialization of FC links 604a, 604b, parameters required for communication are exchanged between the FC switches 602, 602'. A timer is used for parameter exchange between FC switches 602, 602' so that, if the necessary parameters are not delivered from the opposing FC switch 602' before the timer expiration, initialization is repeated for the FC links 604a, 604b (S702, S703). These steps complete the initialization of the FC network 605. The FC network 605' is initialized by following a similar process.

However, inter-network bridging apparatuses 603, 603' that have detected a network abnormality or received a notification of abnormality, do not notify FC switches 602, 602' of the abnormal event, because the network is on a trial basis and a response protocol to abnormality has not been included, as mentioned earlier. For this reason, the initialization processes are not executed in the devices affected by the network abnormality until the expiration of the activated timers in the terminal 601 or 601' and the sequence-complete command indicates that abnormality has ended. Even if the abnormality has been recovered, the initializing processes for the FC networks 605, 605' are executed at different times, therefore, parameter exchanges between the FC switches 602, 602' (performed after the FC links 604a, 604b, 604a', 604b' are initialized) are not completed. Thus, initialization of FC links is repeated for each FC network. In this scenario, depending on the initialization time differences among the FC links 604a, 604b, 604a', 604b', separate initialization processes (init-start, timeout, repeat init-start) are continued in individual FC networks 605, 605' such that initialization is constantly being executed in those FC links belonging to either of the two FC networks. The problem is that, because parameter exchange between the FC switches cannot be completed, init-protocol for the FC networks 605, 605' cannot be completed, and communication between the terminals 601, 601' cannot be carried out.

According to the conventional method, therefore, network operations during abnormality and normality recovery cannot be synchronized in a composite network of FC networks bridged by an ATM network. For this reason, depending on the initialization time differences among the FC networks, parameter exchange necessary for communication between the FC switches cannot be performed normally, which means that init-protocol of the FC networks cannot be completed normally and, ultimately, that the communication between the terminals can not be performed normally.

SUMMARY OF THE INVENTION

It is an object of the present invention to provide an inter-network bridging apparatus and a method for operating the bridging apparatus in a composite network comprised by a plurality of Fibre Channel networks (FC networks) and an Asynchronous Transfer Mode network (ATM network), by which, an abnormal event generated in any of the networks is removed and the composite network is returned to normality, initialization protocol is completed in a normal way, and communication between the FC networks is quickly restored.

To achieve the object, a method is provided for controlling communications in a composite network comprised by a plurality of Fibre Channel networks, whose Fibre Channel links are initialized by executing an initialization protocol, and an Asynchronous Transfer Mode network, known as an ATM network, adjoining the Fibre Channel networks, wherein the Fibre Channel networks and the ATM network are connected through respective inter-network bridging apparatuses to perform tasks comprising the steps of: monitoring the Fibre Channel networks and the ATM network; sending, when necessary, an abnormal notification cell to the ATM network upon detecting an abnormal event in either the Fibre Channel networks or the ATM network; starting an initialization protocol of the Fibre Channel link, upon detecting the abnormal event or receiving an abnormal notification cell from the ATM network; stopping initializing protocol of the Fibre Channel link until an initialization-complete cell is received from the ATM network during execution of the initialization protocol of the Fibre Channel link, and sending a series of initialization-start cells to the ATM network; and, sending an initialization-complete cell to the ATM network when an initialization-start cell is received from the ATM network after sending initialization-start cells.

According to the present invention, the FC/ATM composite network comprised by connect plural FC networks and an ATM network is bridged by dedicated inter-network bridging apparatuses. When an abnormal event is detected by a bridging apparatus in any network, an abnormal notification cell is sent to the ATM network, and the FC link init-protocol is started. If an abnormal notification cell is used to notify the abnormality, the FC link initialization protocol (shortened to init-protocol) is also activated. Therefore, the opposing bridging apparatuses adjacent to the ATM network recognize the abnormal event and start initialization of FC links.

During the execution of the initialization protocol, the process is stopped temporarily until the ATM network responds by sending an initialization-complete cell, and a series of initialization-start cells are dispatched. In the meantime, if an initialization-start cell is received from the ATM network after sending initialization-start cells, an initialization-complete cell is sent to the ATM network.

Therefore, when normality is restored in the networks, an initialization-complete cell is received in each of the bridging apparatuses, and upon receiving the initialization-complete cell, FC link init-protocol, which has been temporarily suspended, can be resumed.

In other words, connect plural FC networks are connected to a common ATM network through dedicated bridging apparatuses, therefore, when an abnormal event is generated in any of the networks, FC networks adjacent to the ATM network are advised of the abnormal event. Accordingly, each FC network performs FC link init-protocol, thereby providing a reliable and quick recovery of the composite network.

Also, the present method provides reliable and quick recovery of the composite network from abnormality, because the adjacent FC networks are advised of the abnormal event essentially at the same time, and the init-protocol can be started essentially at the same time in both FC links. Accordingly, FC link initialization is carried out in each FC network to provide a reliable and quick recovery of the composite network.

An example of the embodied method includes a step of sending the initialization-start cell at periodic intervals until an initialization-complete cell is received.

Accordingly, a problem encountered in the conventional method, that a single dispatch of initialization-start cell may not be received by the opposing network for some reason, can be avoided. In the present method, initialization-start cells are sent repeatedly until conditions are satisfied, thereby enabling concurrent initialization in each FC network and assuring a reliable and quick normality recovery in the composite network.

The object is achieved by providing an apparatus for bridging a plurality of Fibre Channel networks, whose Fibre Channel links are initialized by executing an initialization protocol through an Asynchronous Transfer Mode network, known as an ATM network, comprising: a Fibre Channel-link monitoring section for detecting and monitoring an abnormal event in the Fibre Channel networks; an ATM network monitoring section for monitoring and detecting an abnormal event in the ATM network; and a control section to perform the steps of: sending an abnormal notification cell, upon detecting an abnormal event in either the Fibre Channel networks or the ATM network, to the ATM network, when necessary; starting the initialization protocol for Fibre Channel link, upon detecting the abnormal event or receiving an abnormal notification cell from the ATM network; stopping the initializing protocol for Fibre Channel link until an initialization-complete cell is received from the ATM network during execution of the initialization protocol of the Fibre Channel link, sending a series of initialization-start cells to the ATM network; and, sending an initialization-complete cell to the ATM network when an initialization-start cell is received from the ATM network after sending initialization-start cells.

An example of the embodied apparatus may have a control section to send an initialization-start cell at periodic intervals until an initialization-complete cell is received.

The present inter-channel bridging apparatus and a method of using the apparatus are able to correct abnormality in an FC/ATM composite network most reliably and quickly, according to the features disclosed in the appended claims.

DESCRIPTION OF THE PREFERRED EMBODIMENTS

The following embodiments are not intended to limit the invention disclosed in the claims, and it should be noted that all the combinations of the embodied features are not necessarily essential as solution means of the invention.

Figure 1:
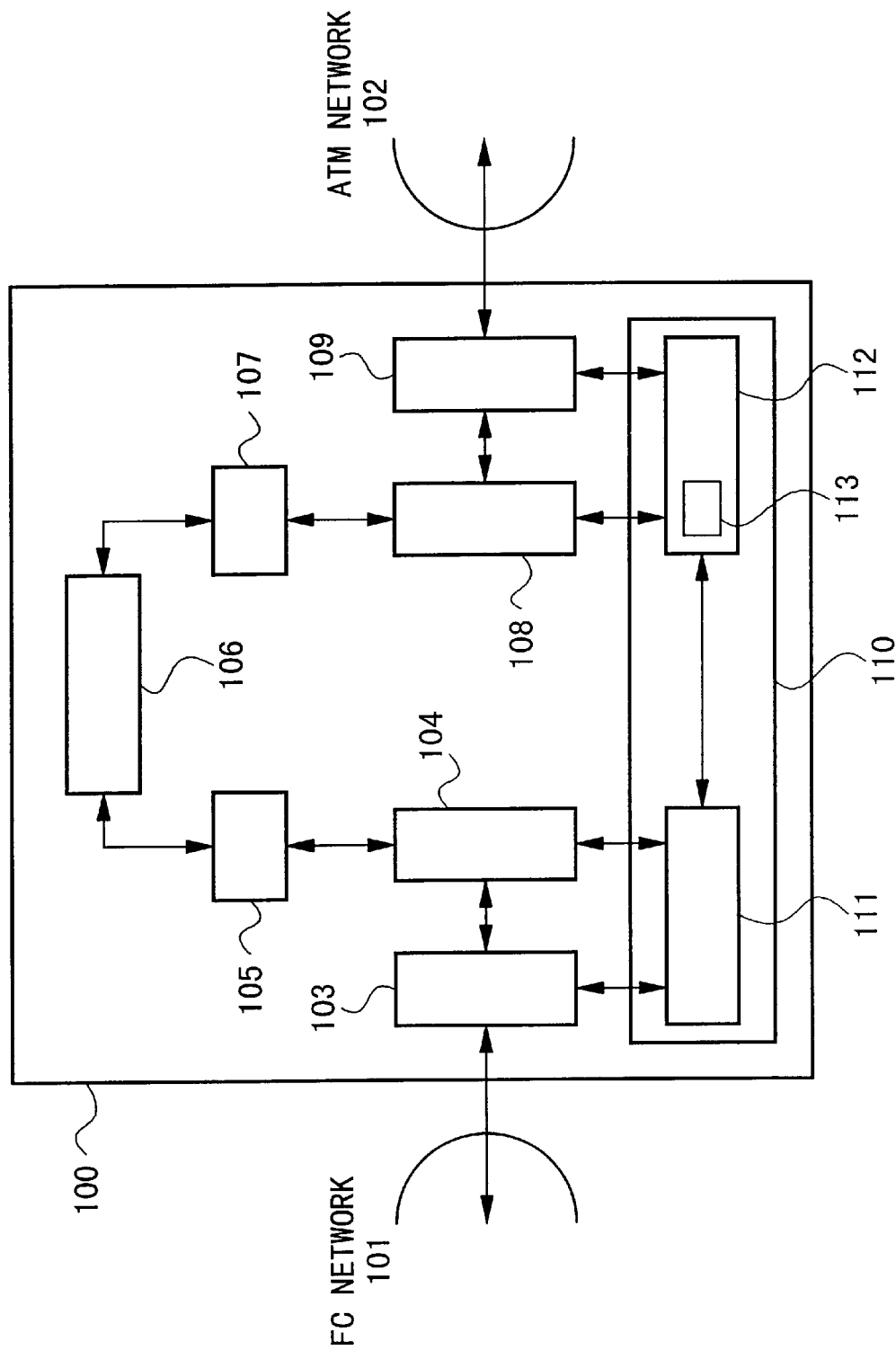
FIG. 1 is a functional block diagram of the inter-network bridging apparatus.

A first embodiment of the invention will be presented with reference to FIG. 1. FIG. 1 is a functional block diagram of an inter-network bridging apparatus connecting an FC network with an ATM network.

The inter-network bridging apparatus 100 connects a FC network 101 and an ATM network 102. Data sent from FC network 101 are transferred, through FC physical interface section 103, a FC-1 layer control section 104, and a FC-2 layer control section 105, to a frame conversion section 106 for ATM Adaptation Layer (AAL) frame and FC-2 layer frame. The AAL frame/FC-2 frame conversion section 106 performs mutual conversion (mapping) of AAL frames and FC-2 frames. Data converted in section 106 are forwarded to ATM network 102 through AAL layer control section 107, ATM layer control section 108 and ATM physical interface section 109. Similarly, data sent from ATM network 102 to FC network 101 are converted and forwarded through the respective control sections and conversion sections.

Figure 5:
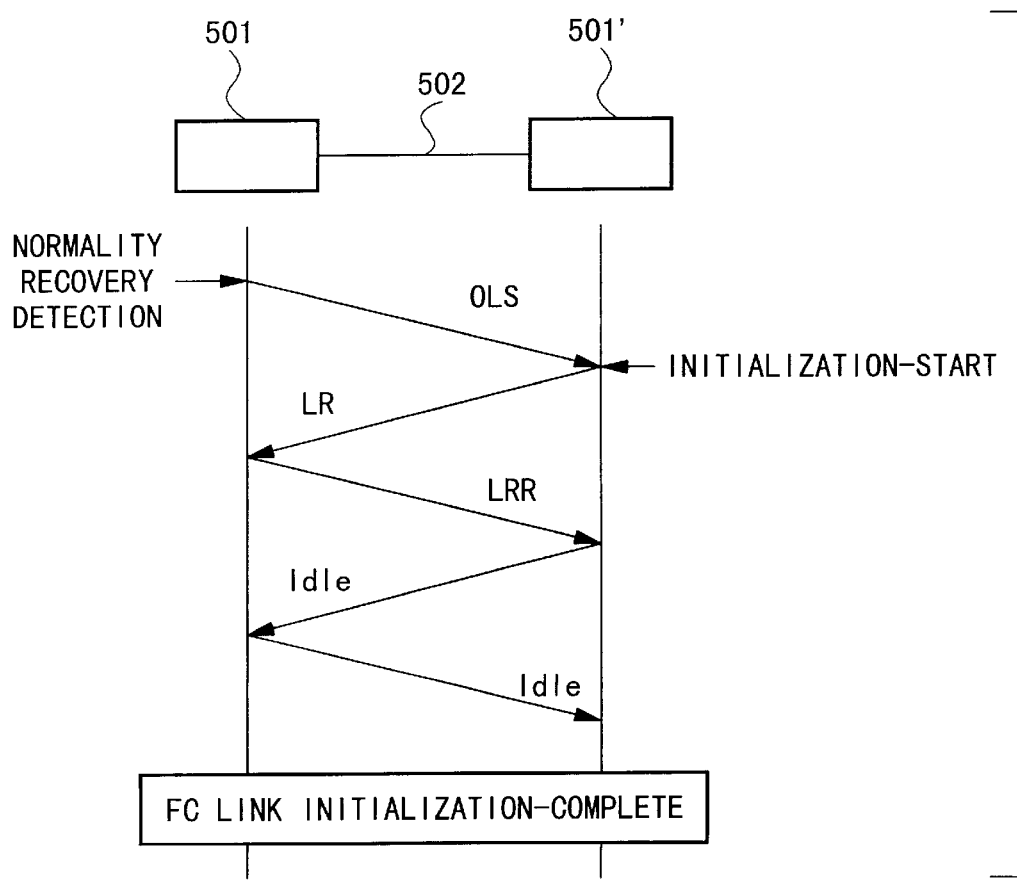
FIG. 5 is a diagram for explaining the init-protocol for FC link.
Figure 6:
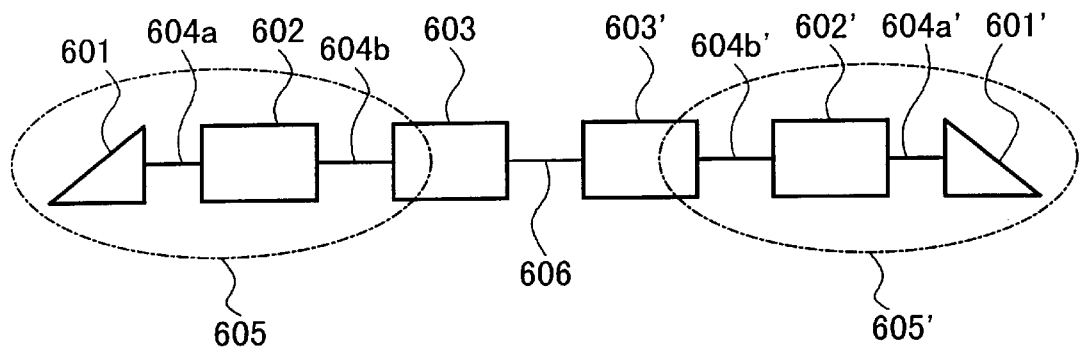
FIG. 6 is a diagram for explaining the configuration of an FC/ATM composite network.
Figure 7:
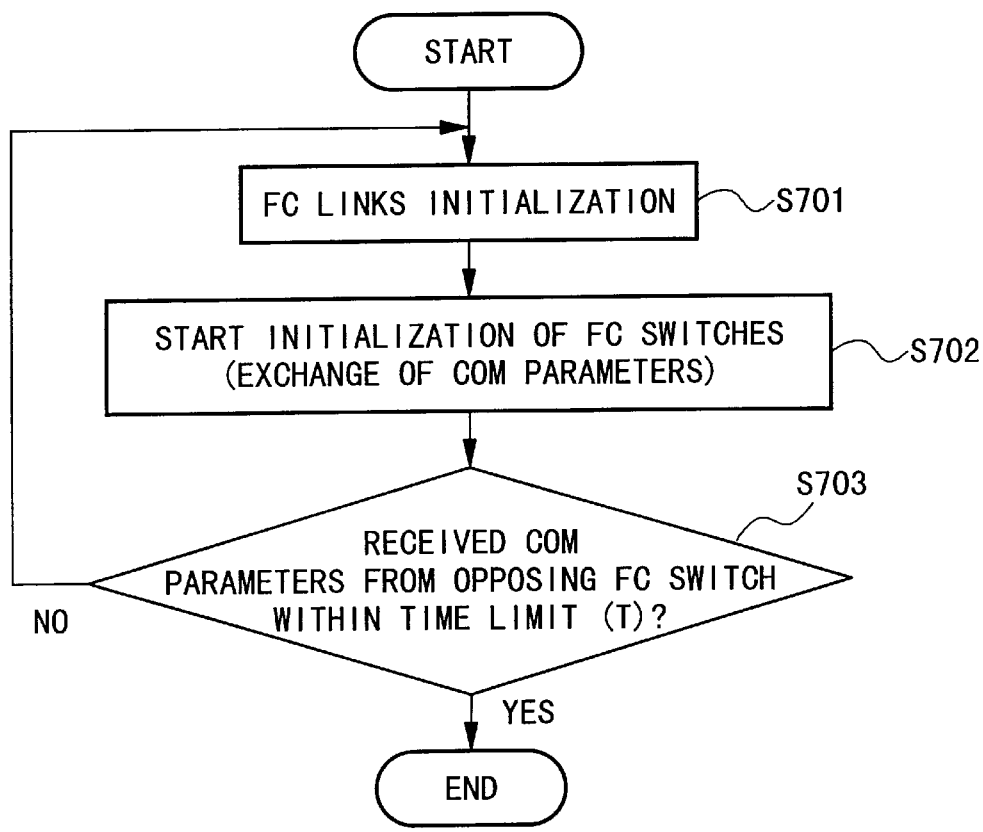
FIG. 7 is a flowchart for init-protocol for the FC networks.

Also, the inter-network bridging apparatus 100 is provided with a control section 110, which connects and controls a FC physical interface section 103, an FC-1 layer control section 104, an ATM layer control section 108, and an ATM physical interface control section 109. Control section 110 is provided with a FC link control monitor section 111, an ATM network control monitor section 112 and a timer 113. FC link control monitor section 111 detects abnormal conditions in FC network 101, as well as controls FC physical interface section 103 and FC-1 layer control section 104 for providing start or stop commands for the FC link initialization-protocol (shortened to init-protocol) in the FC network 101. Also, ATM network control monitor section 112 detects abnormal conditions in ATM network 102, as well as alarm signals from other inter-network bridging apparatuses sharing the common ATM network 102, and commands ATM layer control section 108 and ATM physical interface section 109 to send out various cells (a cell is a data transfer unit comprised by 53 bits). ATM control monitor section 112 incorporates the timer 113, and controls forwarding of cells according to its timing signals. Also, the FC link init-protocol is the same as described above and will not be explained again here (refer to FIG. 5).

Figure 2:
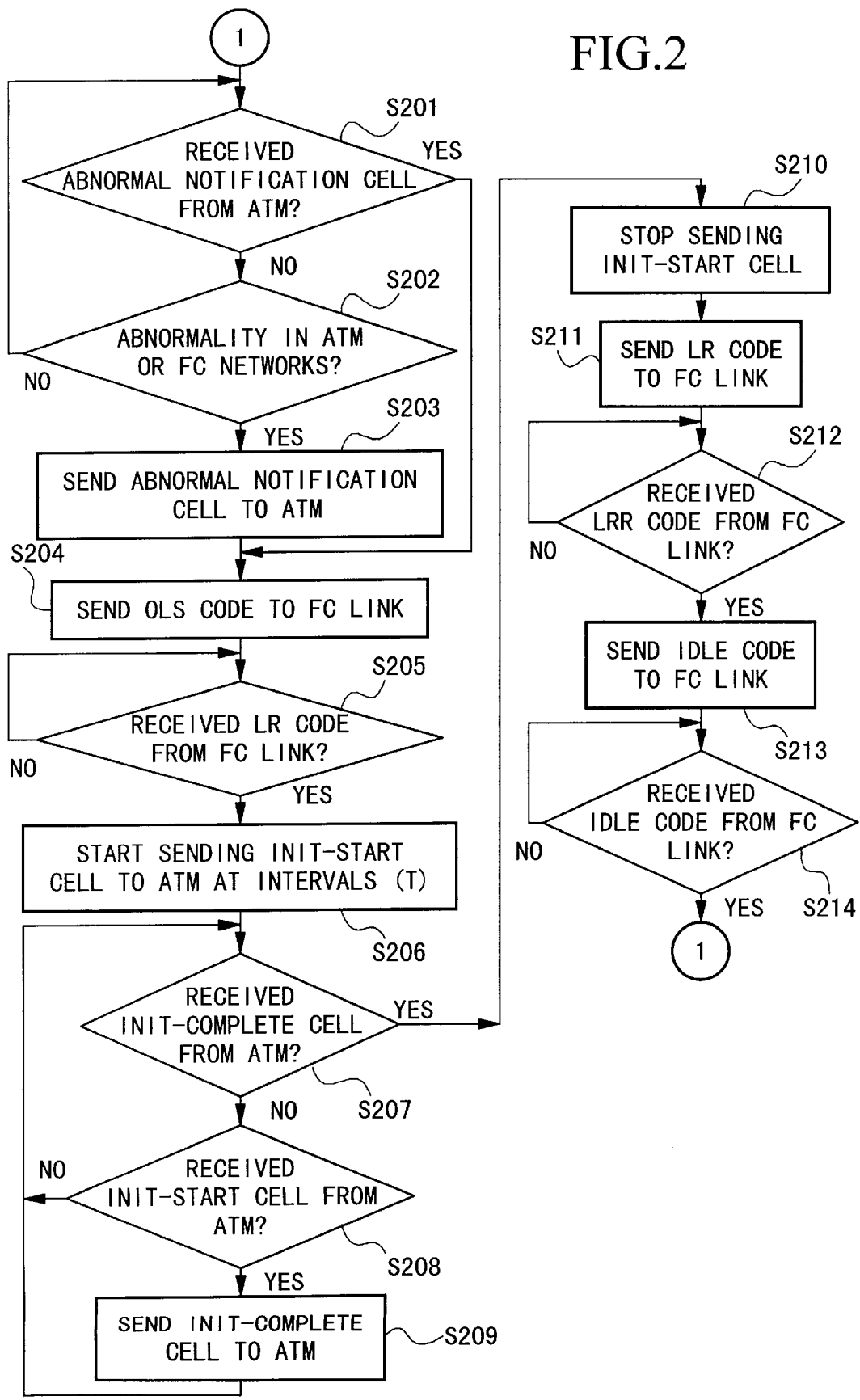
FIG. 2 is a flowchart for the operation of the control section of the inter-network bridging apparatus.

Operation of the control section 110 of the inter-network bridging apparatus 100 will be explained with reference to the flowchart given in FIG. 2. When the control section 110 receives an abnormal notification cell from the ATM network, processing step is transited to step S204 so as to start the FC link init-protocol (S201). The abnormal notification cell is an ATM cell, and can be transmitted by any opposing inter-network bridging apparatuses connecting the FC networks through the common ATM network, and is used to notify an abnormal event occurring in the ATM network or FC networks connected to the bridging apparatus 100. When an abnormal event is detected in the ATM network or FC networks, an abnormal notification cell is sent to the ATM network, and the process is transferred to step S204 so as to start the FC link init-protocol (S202, S203). Here, the term "ATM network abnormality" includes, in addition to the abnormal events in transferring data through the ATM network, startup conditions of the bridging apparatus itself. If "abnormal event" occurs during startup in the inter-network bridging apparatus, the inter-network bridging apparatus detects the abnormal event occurring in the bridging apparatus itself in step S202, and skips the step of sending the abnormal notification cell (S203), and transfers the process to the step S204 to start the FC link init-protocol. In other words, if "abnormal event" is caused by the startup in the inter-network bridging apparatus, the inter-network bridging apparatus starts the FC link init-protocol by performing processing steps subsequent to step S204.

In the FC link init-protocol, the apparatus 100 first sends out an offline code (OLS), and waits for the arrival of an FC link reset code (LR) (S204, 205). When the link reset code (LR) is received from the FC link, it starts sending an init-start cell to the ATM network every periodic interval (T) (S206).

Next, after sending an init-start cell, FC link init-protocol is stopped until an init-complete cell is received from the ATM network. In other words, until an init-complete cell is received from the ATM network, init-start cells are continued to be repeatedly every periodic interval (T). When an init-complete cell is received from the ATM network, the process is transferred to step S210 to re-start the FC link init-protocol (S207). Also, if an init-start cell is received from the ATM network while the FC link init-protocol is being suspended, an init-complete cell is sent to the ATM network (S208, S209).

When an init-complete cell is received from the ATM network, the FC link init-protocol is restarted by taking the first step to stop sending the init-start cells to the ATM network, which has been carried out at periodic intervals (T) (S210). Next, after sending an FC link reset code (LR), the process in a standby state until an FC link reset response code (LRR) is received from the FC link (S211, S212). If the FC reset response code (LRR) is received from the FC link, a special code (Idle) is sent to the FC link, and the process becomes idle until the status code (Idle) is received from the FC link. When the status code (Idle) is received from the FC link, it indicates that the FC link init-protocol has been completed.

Figure 3:
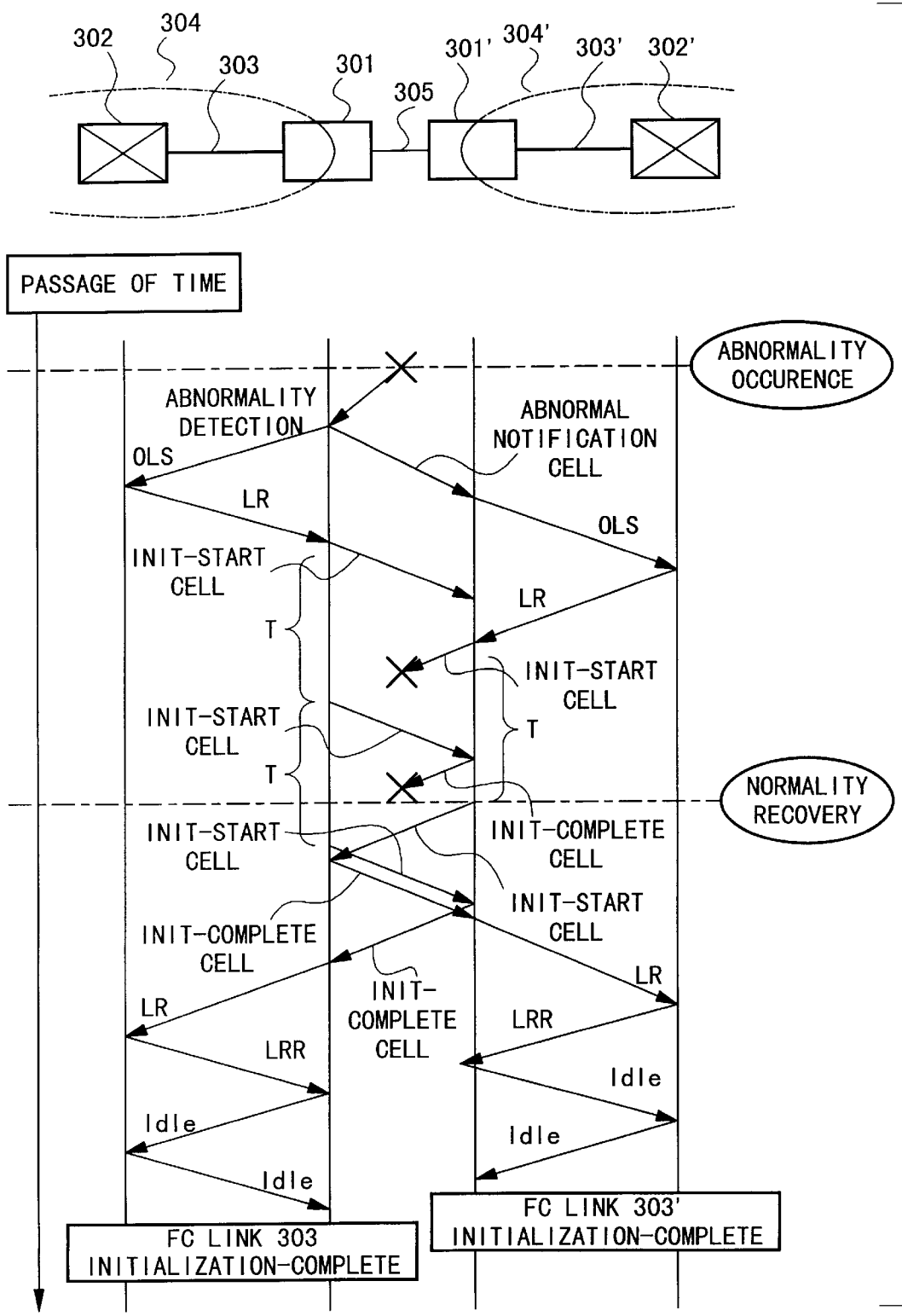
FIG. 3 is a diagram for explaining the sequence of events starting from abnormality generation to normality recovery in the FC/ATM composite network.
Figure 4:
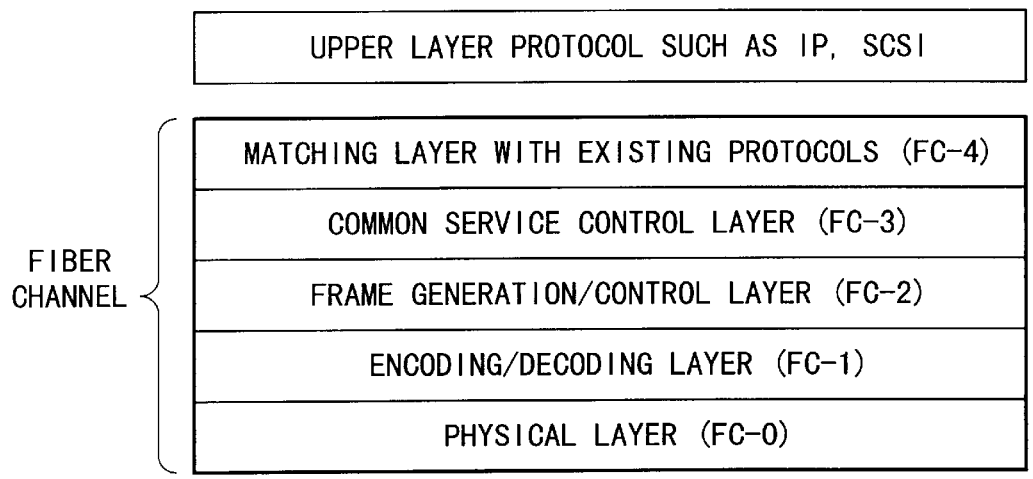
FIG. 4 is a diagram for explaining the protocol stack for Fibre Channel.

Next, the sequence of events from abnormality occurrence to normality recovery in an FC/ATM composite network, bridged by two inter-network bridging apparatuses connecting a common ATM network, will be explained with reference to FIG. 3. FIG. 3 shows the sequence of events which take place in the interval from abnormality generation to normality recovery, and 301 and 301' relate to the inter-network bridging apparatuses; 302, 302' to FC switches; 303, 303' to FC links; 304, 304' to FC networks; and 305 to the ATM network.

The example of abnormal event described in the following relates to a situation in which an abnormal event is occurred in the data transfer line of the ATM network 305 directed from the inter-network bridging apparatus 301' to the inter-network bridging apparatus 301, while the transfer line directing the data from apparatus 301 to apparatus 301' is normal. Also, the FC link init-protocols for FC links 303, 303' are the same as those described above, so that the same reference numerals are used for their explanation.

Inter-network bridging apparatuses 301 and 301' monitor the operation of FC links 303, 303' according to the kind of the ordered set of codes received from the FC links 303, 303', and also monitor the operation of FC networks 304, 304' and ATM network 305 according to alarm signals received from the ATM network.

When the inter-network bridging apparatus 301 detects an abnormal event, it sends an abnormal notification cell to ATM network 305, and starts sending an offline code (OLS) to FC switch 302 to indicate that it is in the init-start state.

When the FC switch 302 receives the offline code (OLS), it detects that an abnormal event has taken place in the network so that the inter-network bridging apparatus 301 is in the init-start state. In response to this detection, FC switch 302 sends a link reset code (LR) to indicate starting of FC link initialization.

The inter-network bridging apparatus 301 which receives the link reset code (LR), periodically sends an init-start cell to the ATM network 305 every interval (T), until an init-complete cell is received from the ATM network 305. Also, the inter-network bridging apparatus 301 withholds sending a link reset response code (LRR) as the response to the link reset code (LR). It should be noted here that, in the conventional method, a link reset response code (LRR) would have been sent to FC switch 302 at this point. Therefore, FC link init-protocol for FC link 302 is temporarily suspended in the present method.

In the meantime, the inter-network bridging apparatus 301' receiving an abnormal notification cell from the ATM network 305 sends an offline code (OLS) to FC switch 302'. FC switch 302' receiving the offline code (OLS) sends a link reset code (LR) to the inter-network bridging apparatus 301', in response. Inter-network bridging apparatus 301' receiving the link reset code (LR) periodically sends an init-start cell to the ATM network 305 every interval (T) until an init-complete cell is received from the ATM network 305. As before, the inter-network bridging apparatus 301' withholds sending a link reset response code (LRR), which would have been sent at the point to FC switch 302' in the conventional method, until an init-complete cell is received from the ATM network 305. Accordingly, the init-protocol of FC link 302' is suspended temporary at this point. The init-start cell sent by the inter-network bridging apparatus 301' is not received by the inter-network bridging apparatus 301 until the abnormality in the ATM network 305 is recovered.

Upon receiving the init-start cell from the ATM network 305, the inter-network bridging apparatus 301' checks whether it has already sent init-start cells, or not. If the inter-network bridging apparatus 301' had already sent init-start cells, the inter-network bridging apparatus 301' will send an init-complete cell to ATM network 305 when an init-start cell is received normally from the ATM network 305. If the inter-network bridging apparatus 301' has not sent any init-start cell, init-complete cell will not be sent.

In the meantime, the init-start cell sent by the inter-network bridging apparatus 301' will not be received by the inter-network bridging apparatus 301 until normality will been restored in the ATM network 305, therefore, the inter-network bridging apparatus 301 will not send an init-complete cell.

When the abnormality in the ATM network 305 is restored, the inter-network bridging apparatus 301 receives the init-start cell sent by the inter-network bridging apparatus 301', and in response, it sends an init-complete cell to the ATM network 305. Upon receiving the init-complete cell, the inter-network bridging apparatus 301' stops sending init-start cells which have been periodically sent every interval (T).

Accordingly, when the abnormality in the ATM network 305 is restored, the time inter-network bridging apparatus 301 and 301' receives an init-complete cell sent from the others are nearly same, as illustrated in FIG. 3.

Each of the inter-network bridging apparatuses 301 and 301' which received the init-complete cell send a link reset code (LR) to the FC switches 302 and 302' to notify the FC link to start initialization respectively, thereby the suspended initialization process of FC links 303 and 303' are restarted. FC switches 302 and 302' which received the link reset code (LR) send respective responses in the form of link reset response code (LRR). Upon receiving the reset response code (LRR), the inter-network bridging apparatuses 301 and 301' are now in a state ready to transfer data, and both apparatuses send a special code (Idle) to respective FC switches 302 and 302'. FC switches 302, 302' receiving the status code (Idle) are now in a state ready to transfer data, and each switch sends a special code (Idle) to the respective inter-network bridging apparatus 301 and 301'. At this point, initialization processes for both FC links 303, 303' are completed.

When the initialization processes for FC links 303, 303' are completed, preparation for communication such as exchanges of parameters necessary for data transfer are completed between the FC switches 302, 302', thereby completing the initialization process for the FC networks.

Another example of abnormal event in the composite network will be illustrated by presenting a case of the inter-network bridging apparatus 301 being activated before the inter-network bridging apparatus 301' being activated. In this case, the difference in the processing sequence from those explained with reference to FIG. 3, is that, if the abnormal event occurs during the startup in the inter-network bridging apparatuses 301 or 301', this event is detected in step S202 shown in FIG. 2 that the abnormality is due to the startup in an inter-network bridging apparatus itself, and the process jumps to step S204 to start the FC link init-protocol, without sending an abnormal notification cell (S203). when the abnormal event occurs during the startup in any inter-network bridging apparatuses, inter-network bridging apparatuses 301 and 301' both perform FC init-protocol steps following step S204. Other steps are the same as those described above. In this case, "normality recovery" in FIG. 3 relates to startup phase of the inter-network bridging apparatus 301'.

As explained above, upon detecting an ATM abnormality or an FC link abnormality, the present inter-network bridging apparatus is able to notify FC switches and inter-network bridging apparatuses of the opposite networks connected through a common ATM network of the abnormality. Therefore, when normality is recovered in the composite network, FC link initialization can be carried out reliably and quickly with such the notifications. Also, initialization processes can be carried out in connect plural FC networks connected to the ATM network at the nearly same time, thereby providing smooth initialization process of the FC/ATM composite network.

Similarly, even during the startup of inter-network bridging apparatuses, FC links can be initialized at the nearly time, so that the initialization process for the composite network can proceed smoothly.

It should be noted that, in this embodiment, an example of the composite network given in FIG. 3 related to abnormality in one of the FC networks adjacent to the common ATM network. It is clear however, that abnormality in FC links or bi-directional abnormality in the ATM network can also be handled reliably and quickly by the same methodology to provide smooth reinitialization for the FC/ATM composite network.

Also, it should be noted that the sequence of processing steps need not be limited to those demonstrated, and other init-protocol sequences are equally applicable. It would be evident furthermore that although the example was based on conversion (mapping) between AAL frame and FC-2 frame, other approaches, such as conversion (mapping) between AAL frame and FC-1 frame, are equally applicable.

Also, it is noted that the bridging operation between FC networks and ATM network can be carried out by means of computer application programs contained in a computer readable recording medium to be operated by a computer system. Computer system, in this context, includes any operating systems (OS) and peripheral hardwares that are connected (remotely or directly) to the FC networks and ATM network. Computer readable recording media includes portable media such as floppy disks, opto-magnetic disks, ROM, CD-ROM, as well as fixed devices such as hard disks housed in computer systems. Application program may perform a part of the described functions, or may be operated in conjunction with pre-recorded programs stored in computer systems.

As explained above, the present inter-network bridging apparatus can be used to connect connect plural FC networks to an ATM network to form an FC/ATM composite network, and when an abnormal event occurs in the composite network, FC networks adjoining the ATM network are notified of the abnormal event, and when normality is restored, the initializing protocol is started in each FC network almost simultaneously. Therefore, when the abnormality is eliminated from the composite network, it is possible to complete the initialization processes normally in the FC networks adjoining the ATM network so that communication between the FC networks can be restored quickly. Similarly, FC link initialization can be started almost simultaneously at the startup of the inter-network bridging apparatus, so that initialization process for the composite network can be carried out smoothly.

Also, the composite network is configured so that an initialization-start cell is sent periodically every constant intervals until an initialization-complete cell is received by the apparatus on the receiving-side so that the normality recovery and completion of initialization preparation can be performed reliably and quickly.

What is claimed is:

1. A method for controlling communications in a composite network comprised by plural Fibre Channel networks, whose Fibre Channel links are initialized by executing an initialization protocol, and an Asynchronous Transfer Mode network, known as an ATM network, adjoining said Fibre Channel networks, wherein said Fibre Channel networks and said ATM network are connected through respective inter-network bridging apparatuses to perform tasks comprising the steps of:

monitoring said Fibre Channel networks and said ATM network;

sending, when necessary, an abnormal notification cell to said ATM network upon detecting an abnormal event in either said Fibre Channel networks or said ATM network;

starting an initialization protocol of said Fibre Channel link, upon detecting said abnormal event or receiving an abnormal notification cell from said ATM network;

stopping said initialization protocol of said Fibre Channel link until an initialization-complete cell is received from said ATM network during execution of said initialization protocol of said Fibre Channel link and sending a series of initialization-start cells to said ATM network; and sending an initialization-complete cell to said ATM network when an initialization-start cell is received from said ATM network after sending initialization-start cells.

2. A method according to claim 1, wherein said method includes a step of sending an abnormal notification cell to said ATM network, upon detecting an abnormal event in said Fibre Channel networks or said ATM network excepting a case of an abnormal event caused by startup in said inter-network bridging apparatus.

3. A method according to claim 1, wherein an initialization-start cell is sent at periodic intervals until an initialization-complete cell is received.

4. A method according to claim 2, wherein an initialization-start cell is sent at periodic intervals until an initialization-complete cell is received.

5. An inter-network bridging apparatus for bridging between plural said Fibre Channel networks, whose said Fibre Channel links are initialized by executing an initialization protocol, and an Asynchronous Transfer Mode network, known as an ATM network, comprising:

a Fibre Channel-link monitoring section for monitoring and detecting an abnormal event in said Fibre Channel networks;

an ATM network monitoring section for monitoring and detecting an abnormal event in said ATM network; and a control section to perform the steps of: sending an abnormal notification cell, upon detecting an abnormal event in either said Fibre Channel networks or said ATM network, to said ATM network, when necessary; starting said initialization protocol for Fibre Channel link, upon detecting said abnormal event or receiving an abnormal notification cell from said ATM network; stopping said initializing protocol for Fibre Channel link until an initialization-complete cell is received from said ATM network during execution of said initialization protocol of said Fibre Channel link, sending a series of initialization-start cells to said ATM network; and, sending an initialization-complete cell to said ATM network when an initialization-start cell is received from said ATM network after sending initialization-start cells.

6. An apparatus according to claim 5, wherein said control section sends an abnormal notification cell to said ATM network, upon detecting an abnormal event in said Fibre Channel networks or said ATM network excepting a case of an abnormal event caused by startup in said inter-network bridging apparatus.

7. An apparatus according to claim 5, wherein said control section sends initialization-start cells at periodic intervals until an initialization-complete cell is received.

8. An apparatus according to claim 6, wherein said control section sends initialization-start cell at periodic intervals until an initialization-complete cell is received.

9. A computer program product containing a computer readable program recorded on a computer usable medium for causing a computer to initialize Fibre Channel link by executing an initialization protocol, said computer program effecting the steps of:

monitoring operations of said Fibre Channel networks and said ATM network;

sending, when necessary, an abnormal notification cell upon detecting an abnormal event in either said Fibre Channel networks or said ATM network;

starting an initialization protocol of said Fibre Channel link, upon detecting said abnormal event or receiving an abnormal notification cell from said ATM network;

sending a series of initialization-start cells to said ATM network; and stopping initializing protocol of said Fibre Channel link until an initialization-complete cell is received from said ATM network during execution of said initialization protocol of said Fibre Channel link; and sending an initialization-complete cell to said ATM network when an initialization-start cell is received from said ATM network after sending initialization-start cells.

10. A computer program product according to claim 9, wherein said computer program effecting a step of sending an abnormal notification cell to said ATM network, upon detecting an abnormal event in said Fibre Channel networks or said ATM network excepting a case of an abnormal event caused by startup in said inter-network bridging apparatus.

11. A computer program product according to claim 9, wherein said initialization-start cell is sent at periodic intervals until an initialization-complete cell is received.

12. A computer program product according to claim 10, wherein an initialization-start cell is sent at periodic intervals until an initialization-complete cell is received.

* * * * *